Dec. 15, 1931.  F. CONRAD  1,837,017

CONDENSER

Filed July 24, 1925

WITNESSES:

INVENTOR
Frank Conrad.
BY
ATTORNEY

Patented Dec. 15, 1931 1,837,017

UNITED STATES PATENT OFFICE

FRANK CONRAD, OF PITTSBURGH, PENNSYLVANIA, ASSIGNOR TO WESTINGHOUSE ELECTRIC & MANUFACTURING COMPANY, A CORPORATION OF PENNSYLVANIA

CONDENSER

Application filed July 24, 1925. Serial No. 45,778.

My invention relates to condensers and particularly to condensers suitable for use in the main oscillating circuit of high power radio sending stations.

It is an object of my invention to produce a condenser which can be used in a high power oscillating circuit without danger of overheating.

It is a further object of my invention to produce a condenser in which the insulating parts of the supporting structure are so located relative to the electrostatic field that but little energy will be absorbed in the insulation.

It is a further object of my invention to produce a condenser in which the insulation supporting one electrode from the other shall not be subjected to any very great electrostatic stresses even under high potential conditions.

It is a further object of my invention to produce a condenser in which ample insulation and large capacity is obtained without a corresponding increase in the space required for the instrument.

Figure 1:
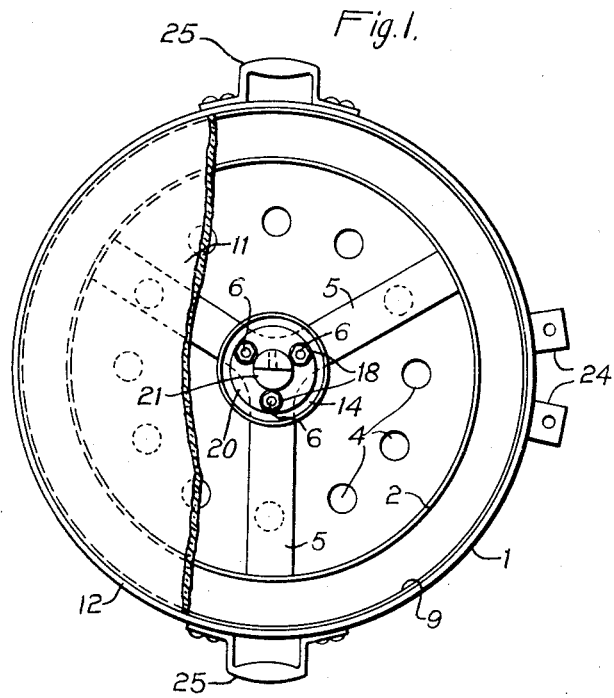
Figure 2:
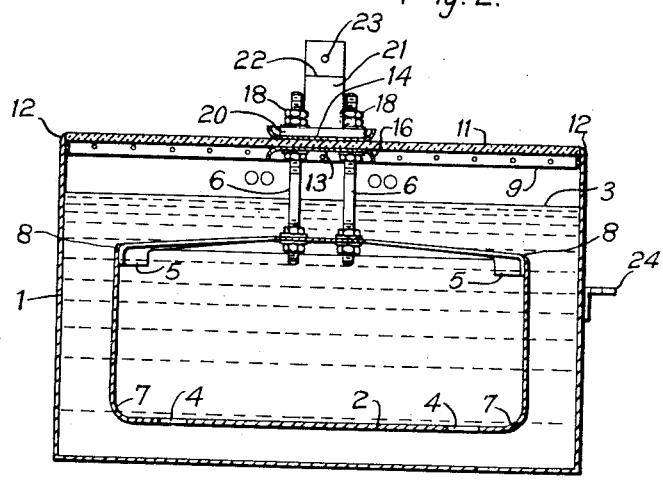

Other objects of my invention and details of the construction will be apparent from the following description and accompanying drawings, in which Figure 1 is a top plan view, a portion of the cover being broken away, and Fig. 2 is a central vertical section.

The condenser comprises an outer tank 1, preferably of brass, and an inner electrode 2, preferably of copper. Each of the electrodes is preferably a hollow cylinder closed at one end but my invention is applicable to an outer electrode having the form of any receptacle or dish and an inner electrode of approximately similar form. The outer electrode serves as a receptacle for a body of oil 3. The inner one also encloses a portion of this oil but the bottom of the electrode 2 is provided with holes 4 through which the oil may readily pass.

The inner electrode is so formed that it presents no sharp corners or edges, along which the electric field might concentrate and thus tend to produce corona or a brush discharge, with accompanying losses. For this purpose, the junction of the side walls and the bottom of the electrode 2 is rounded as shown at 7, and the edge at the top of the side wall is turned inward, as shown at 8. The edge 8 may be sharp without resulting in a concentrated field because it is turned away from the electrode 1 and therefore is not subject to the heavy potential which exists between the parallel surfaces of the electrodes.

The inner electrode 2 is provided with a spider 5 by means of which the electrode is attached to the central rods 6. The rods and spider also serve as conducting means through which the current is conveyed to the inner electrode.

The outer electrode or tank is provided with a rib or inwardly-extending flange or collar 9 which affords a support for a glass cover 11. This cover may be of any insulating material having small dielectric losses, but preferably it is of Pyrex glass. The edge 12 of the tank extends above the rib 9 and forms a guard for the edge of the glass.

Holes are provided at the central part of the glass cover 11 through which the rods 6 extend. On each side of the cover are saucer-like metal disks 13 and 14. The margin of the disk on the under side of the cover is turned down, as shown at 16, whereby the margins diverge outwardly. The rods 6 are provided with nuts, by means of which the spider 5 is secured and the disks 13 and 14 are clamped against the glass. The upper nuts 18 also secure in place a collar 20 which is electrically connected to the end of a stud 21 provided with a shoulder 22 and a hole 23 for bolting a conductor thereto.

Connection to the tank is provided for by means of lugs 24, to which conductors may be bolted.

For convenience in handling the condenser, the tank is provided with a pair of handles 25.

In the operation of the device, the condenser is connected into an oscillating circuit so that the tank 1 forms one electrode and the member 2 the opposite electrode. When oscillations occur in the circuit, the oil in the space between the electrode 2 and the tank 1 becomes heated. This interspace includes the horizontal region between the bottom of the tank and the bottom of the electrode 2 and the annular cylindrical region between the vertical wall of the electrode 2 and the vertical wall of the tank. The tank is filled with oil to a sufficient height above the edge 8 of the dish 2 to insure ready flow of the oil across the edge.

When oscillations are produced in the circuit, the dielectric losses in the oil occur principally in the interspace. The oil in this region is, therefore, heated more than the rest of the oil and convection currents pass through the openings 4. Convection currents also pass over the edge 8 of the electrode 2, causing a continuous circulation of oil while the circuit is oscillating. The oil which is subjected to heating is nearer the wall of the tank 1 than the rest of the oil. Consequently, the hot oil is in the best position for cooling by radiation.

The condenser is adapted for use in circuits operating at high potentials and, because of the absence of any sharp edges on the electrodes 2 directed toward the tank 1, there will be no concentration of the electrostatic field within the oil. Consequently, there will be no excessive losses due to brush discharges or other consequences of such concentration.

Because the total volume of oil is large compared to the oil directly subjected to the electrostatic stresses, if a flash-over does happen, only a small percentage of the oil is carbonized and the carbonized oil is largely and rapidly diluted by the uninjured oil. Consequently, even when the condenser is used at higher potentials than those for which it was designed, the oil deteriorates only slowly.

The rods 6 and the connection between them and the stud 21 are at the same potential as the electrode 2. For this reason, the glass 11 must be protected from the field adjacent to said rods. The disks 13 and 14, by distributing the potential of the rods 6 over a considerable area adjacent to the glass, prevent any strong electrostatic field in the glass itself near the rods. The margins of these disks being curved, do not present any abrupt change of potential where the glass extends between these margins. Instead, the potential change is gradual because of the gradual approach of the disks 13 and 14. For this reason, only slight strains are introduced into the glass cover where the support for the inner electrode is attached thereto, and the losses at this point are correspondingly small.

The outer edge of the cover 11 meets the tank 1 at a point well removed from the inner electrode 2. Consequently, by reason of the difference of potential between the tank and the inner electrode, the field is not large at the edge of the glass cover. Moreover, because the currents of the tank extend well above the walls of the electrode 2, the direction of the field at the edge 12 is at a considerable angle to the cover. Consequently, but little strain is produced in the cover at the outer edge and the losses introduced in the cover are small.

The rods 6 and disks 13 and 14 at the center of the glass cover are separated from the edge 12 of the tank by a relatively large distance. The potential gradient along the radius of the cover is therefore, small. This results in only small dielectric losses in the glass.

It has been found that with a condenser built according to this invention, the glass cover becomes only slightly warm, even when the power used in the oscillating circuit is sufficient to cause the glass of condensers heretofore used to be completely melted. With a condenser of the type herein described, having a tank 18" x 11" and having a capacity of .0003 microfarads, a power of 300 kva. at 50 amperes and 3000 kilocycles can be handled and the increase in temperature resulting is only 10° C.

While I have described in specific detail one particular embodiment of my invention, it is not intended that this be construed as a limitation. Many variations therein will be evident to those skilled in the art. The only limitations intended are those necessitated by the prior art and recited in the claims.

I claim as my invention:

1. In a condenser, an inner dish-shaped electrode, an outer dish-shaped electrode having an edge extending above the inner electrode, an insulating plate resting on the edge of said outer electrode, and a conductive support attached to said insulating plate remote from said edge and carrying said inner electrode, the attachment of said support to said plate including disks between which said plate is clamped, the margins of said disks being turned away from said plate.

2. In a condenser, an inner dish-shaped electrode, an outer dish-shaped electrode, a spider supporting said inner electrode, a rod supporting said spider, a plate of insulation resting on said outer electrode and having a hole through which said rod extends, and guard plates surrounding said rod on either side of said plate of insulation, the margins of said guard plates diverging outwardly.

In testimony whereof, I have hereunto subscribed my name this 11th day of July, 1925.

FRANK CONRAD.